United States Patent [19] [11] 4,054,154
Mason [45] Oct. 18, 1977

[54] SELF MONITORING REDUNDANT HYDRAERIC CONTROL SYSTEM

[75] Inventor: Richard K. Mason, Granada Hills, Calif.

[73] Assignee: Textron Inc., Providence, R.I.

[21] Appl. No.: 153,858

[22] Filed: June 16, 1971

Related U.S. Application Data

[62] Division of Ser. No. 880,166, Nov. 26, 1969, abandoned.

[51] Int. Cl.[2] .................... F15B 13/043; F15B 13/06; F16K 11/07

[52] U.S. Cl. ............................ 137/625.62; 91/411 R; 91/459; 91/461; 137/625.64

[58] Field of Search .................... 91/459, 461, 363 A, 91/457; 137/625.62, 625.64, 596.16

[56] References Cited

U.S. PATENT DOCUMENTS 3,391,611 7/1968 Jenney ................................ 91/459

*Primary Examiner*—Irwin C. Cohen
*Attorney, Agent, or Firm*—Nilsson, Robbins, Dalgarn, Berliner, Carson & Wurst

[57] ABSTRACT

A control system having a plurality of control channels each having its own source of system hydraeric fluid under pressure and each having a control valve and a monitor valve. A position indicating pressure signal is generated by each of the valves and is compared to detect discrepancies therebetween, and in the event of such a discrepancy, to generate a failure indicating signal. The failure indicating signal is subsequently transmitted to appropriate control apparatus which will effect proper switching to eliminate any part of the failed system from control or future possible control of the apparatus to which the system is connected.

1 Claim, 3 Drawing Figures

SELF MONITORING REDUNDANT HYDRAERIC CONTROL SYSTEM

REFERENCE TO OTHER APPLICATIONS

This application is a divisional application of U.S. Pat. application Ser. No. 880,166, filed Nov. 26, 1969, entitled "Self Monitoring Redundant Hydraulic Control System,"now abandoned.

FIELD OF THE INVENTION

The invention relates generally to control systems and more particularly to redundant control systems adapted for positioning a desired apparatus in response to application of input control signals.

BACKGROUND OF THE INVENTION

The best prior art known is U.S. Pat. Nos. 3,391,611 issued to July 9, 1968 to Gavin D. Jenney and 3,270,623 issued Sept. 6, 1966 to K. D. Garnjost et al. The present invention is an improvement upon the monitor valve and system disclosed in U.S. Pat. No. 3,391,611.

Although the system disclosed in U.S. Pat. No. 3,391,611 works extremely well, it has been discovered that differences in the pressures of the fluid utilized in each of the channels, whether command, stand-by or monitor, may affect switching times in the event a failure is detected.

It has also been found desirable to produce a redundant control system maintaining at least as good reliability, response and control accuracy as prior art systems while at the same time making the system less complex, lighter in weight, less costly, and effecting faster switching times upon the detection of a disparity within the system.

SUMMARY OF THE INVENTION

There is provided a redundant control system having first and second control channels which includes first and second control valves and first and second monitor valves each connected respectively to first and second sources of hydraeric fluid. The monitor valves are models of the respective control valves. A transducer means adapted to produce a position indicating pressure signal is connected to each of the control and monitor valves. A pair of comparator means are utilized and connected so that one receives the position indicating pressure signal from the first monitor and control valve while the other receives the position indicating signal from the second monitor and control valve. A switching means is then provided and is coupled to receive failure indicating signals generated by the comparator means upon detecting a disparity between the signals produced by the transducer means.

Included within the system is a self monitoring valve which includes a flow control valve and a dynamically exact model thereof. Position indicating pressure signals are generated by transducers connected to the valve and the model. Means is provided for connecting the same source of hydraeric pressure to the valve and the model.

DESCRIPTION OF THE PREFERRED EMBODIMENT

Figure 1:
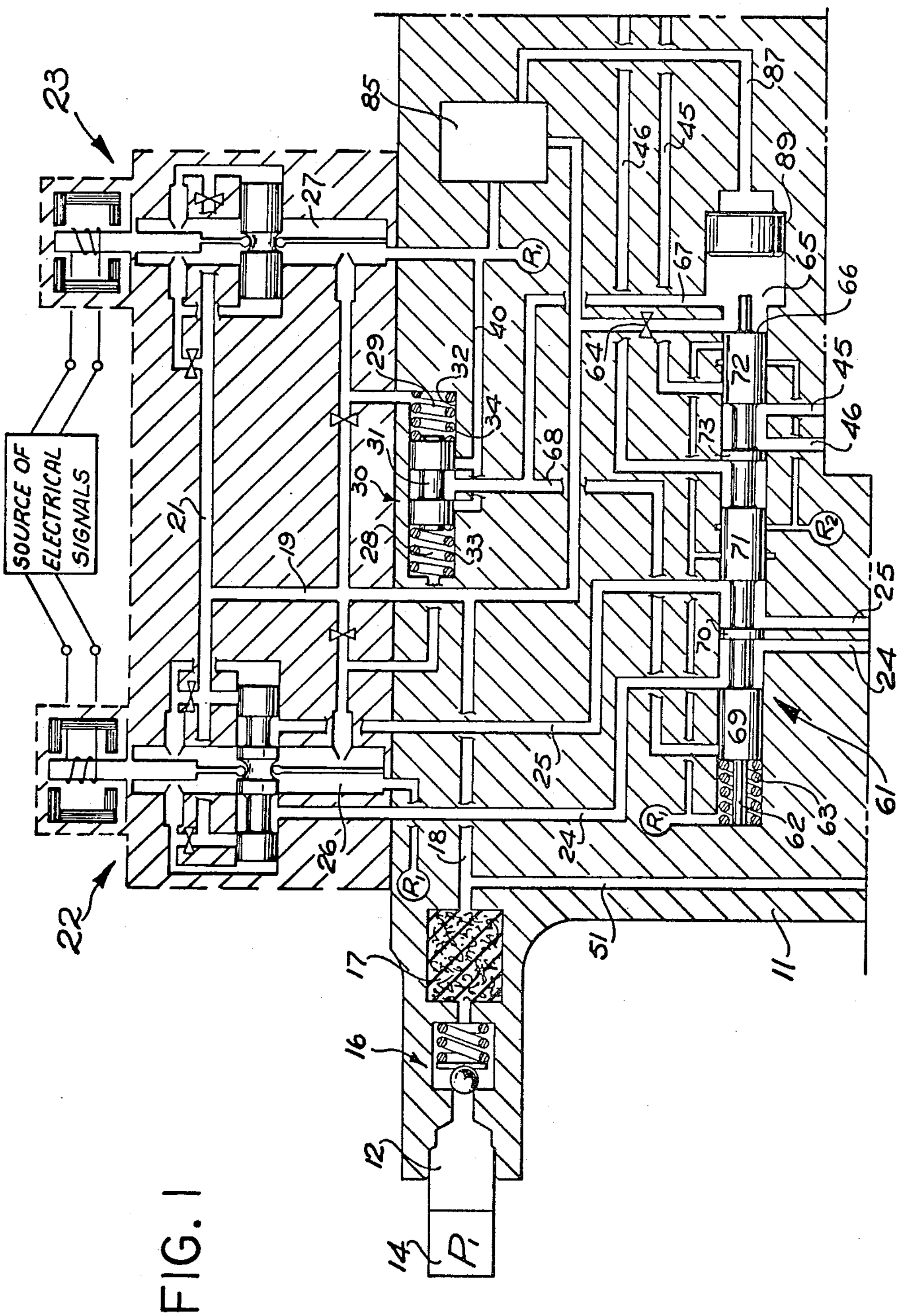
FIGS. 1, 2 and 3 represent an overall schematic diagram of a redundant control system constructed in accordance with the present invention, but broken apart along the broken lines for purposes of clarity of illustration.
Figure 2:
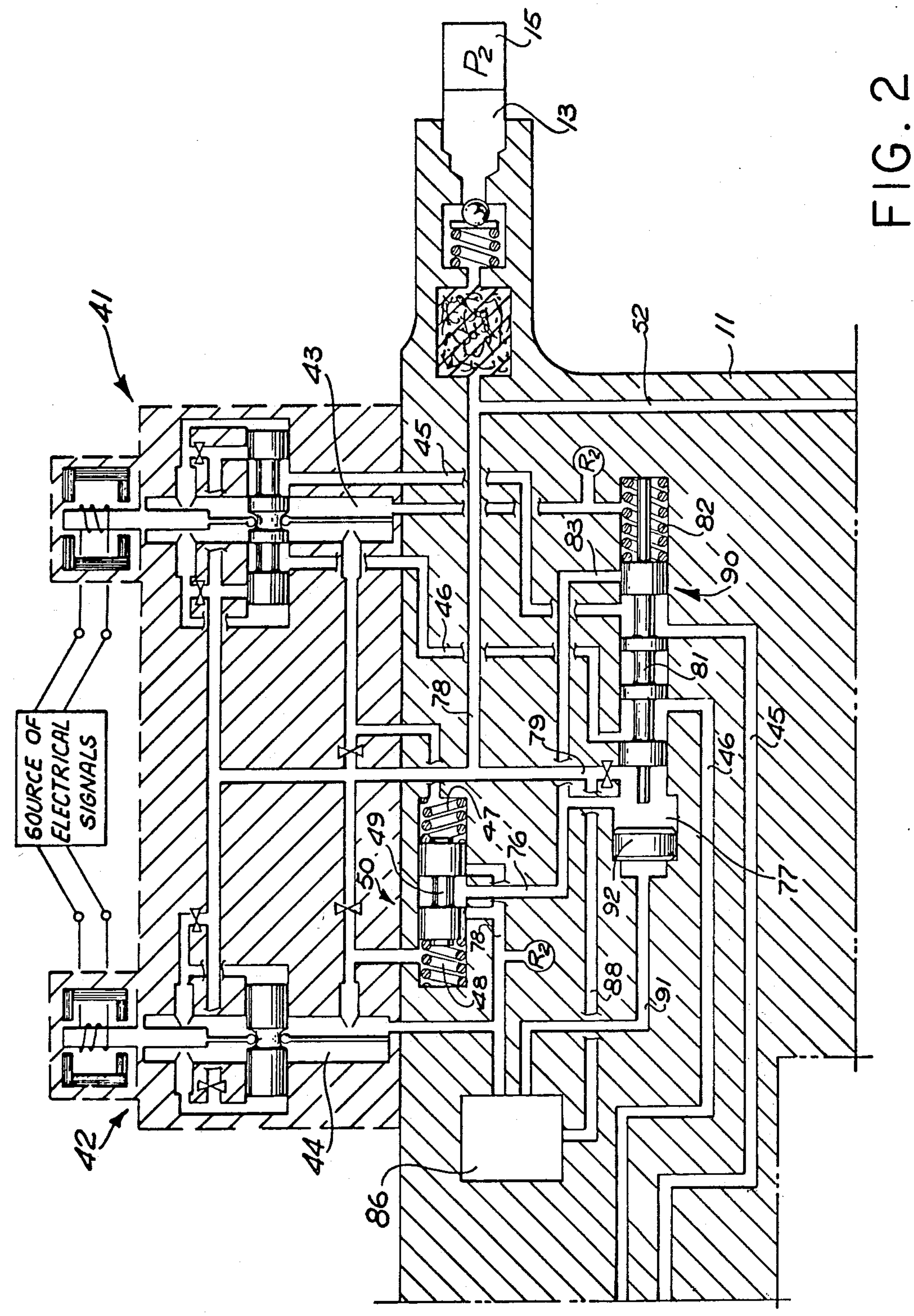

As is shown in FIGS. 1 and 2, a housing 11 defines ports 12 and 13 to which sources of hydraeric fluid 14 and 15, respectively, are connected. These sources of hydraeric fluid are designated $P_1$ and $P_2$ respectively. The term "hydraeric" as used throughout this specification and the appendant claims is defined as being generic to hydraulic and pheumatics and as synonymous, in the broad sense, with fluid under pressure.

The source of pressure $P_1$ is applied through a check valve 16 and a filter 17 to a passageway 18 which in turn is connected through an additional passageway 19 to a passageway 21 which is connected to a control valve 22 and a monitor valve 23 thus applying the same hydraeric source to the valves 22 and 23.

The valves 22 and 23 are electrohydraulic servovalves of the type commonly known in the prior art as double nozzle-flapper valves, which generate a differential pressure signal in response to the application of an electrical signal to an electrical torque motor. The differential pressure signal is then applied to equal end areas of a spool valve to position the same in response to the applied electrical signals. Such valves are well known in the prior art and may, for example, take the form of the valve shown and described in U.S. Pat. No. 2,947,286 and, therefore, will not be further described herein.

As the spool valve of the control valve 22 moves responsive to the differential pressure signals above referred to, hydraeric fluid is caused to flow through passageways 24 and 25 to control the position of an actuator as will be more fully described below. As the control valve moves to control the flow of fluid, the monitor valve also moves. Under required design considerations in accordance with the present invention, the monitor valve dynamically exactly duplicates the characteristics of the control valve 22. In accordance with some design considerations, the monitor valve 23 may be an exact duplicate of the control valve 22. However, it should also be understood that various other mechanical and hydraeric configurations may be utilized, if desired, so long as the overall characteristics are dynamically the same. For this reason the monitor valve 23 may hereinafter sometimes be referred to as a "model" of the control valve In any event, both the control valve 22 and the monitor valve 23 have transducer means 26 and 27 respectively, coupled thereto for producing a position indicating pressure signal. As is illustrated, the transducer means 26 and 27 take the form of a flapper-nozzle pressure signal generating apparatus of the type shown and described in U.S. Pat. No. 3,391,611, and, therefore, detailed description thereof will not be given herein. As is described in U.S. Pat. No. 3,391,611 and understood by those skilled in the art, the nozzle orifice of the transducers 26 and 27 varies as the spool of the control and monitor valves 22 and 23 move thereby generating a position indicating pressure signal proportional to the position of the spool in the control and monitor valves. The position indicating pressure signal of the transducer 26 is applied to the chamber 28 of a comparator shown generally at 30 while the position indicating pressure signal of the transducer 27 is applied to the chamber 29 thereof. The comparator 30 includes a spool 31 slidably disposed within a bore 32 with springs 33 and 34 disposed in the chambers 28 and 29 respectively, to maintain the spool 31 in a centered position in the absence of pressure differential appearing between the signals generated by the transducers 26 and 27 and appearing in the chambers 28 and 29 respectively. Thus, it should be clearly understood that the comparator 30 is connected to receive only the position indicating signals generated by the transducers connected to those control and monitor electrohydraulic servovalves which are connected to the same hydraeric source. Since the same hydraeric source is used in generating the position indicating signals, any fluctuations or variations in the pressure thereof are automatically compensated for. In the prior art systems, as shown for example in U.S. Pat. Nos. 3,391,611 and 3,406,702 issued Oct. 22, 1968 to Gavin D. Jenney, the position indicating pressure signals from valves and monitors connected to two or more hydraeric sources are compared by the comparator apparatus. Under such circumstances, variations between system pressure (either source or return) from source to source may cause failure indicating signals to be generated when in fact no such failure has occurred. With the system of the present invention, this area of difficulty has been removed since each comparator deals only with one hydraeric source.

As illustrated in FIG. 2, a similar control valve 41 and monitor valve 42 has source of pressure $P_2$ applied thereto. As the control valve 41 functions as above described, hydraeric fluid is caused to flow through conduits 45 and 46 for purposes to be described more fully below. Similarly transducers 43 and 44 are connected to control valve 41 and monitor valve 42 to produce position indicating pressure signals which are applied to each end of a comparator 50 which is constructed and functions similarly to the comparator 30. Thus, position indicating pressure signals generated by the transducer 43 are applied to the chamber 47 while position indicating signals generated by the transducer 44 are applied to the chamber 48 which, upon discrepancy therebetween, cause the spool 49 to translate and thereby produce a failure indicating signal. A failure indicating signal may also be generated by the comparator 30 and such will be discussed more in detail herein below.

Figure 3:
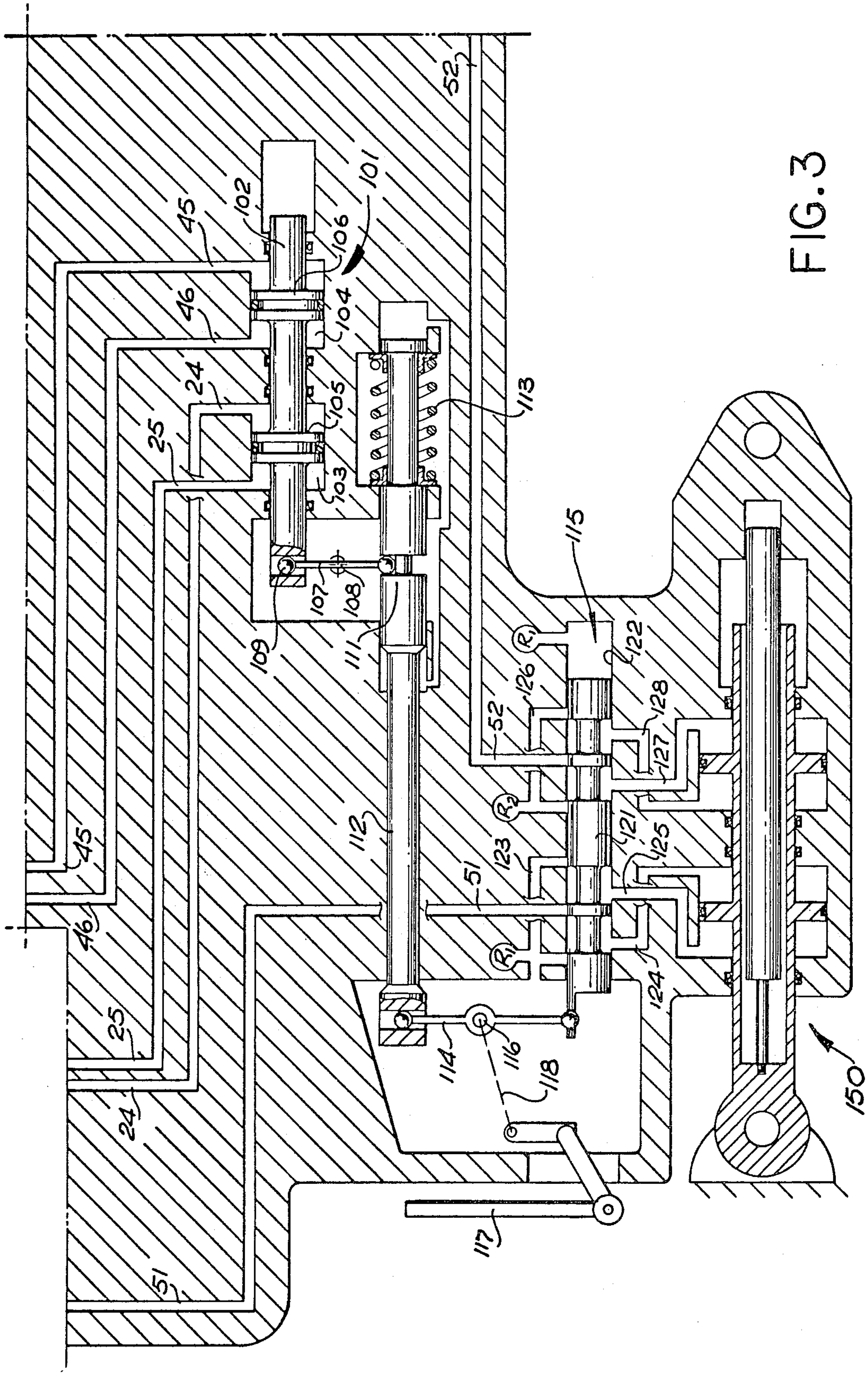

Fluid flow through the conduits 24 and 25 from the control valve 22 passes through a shut-off-engage valve 61 and then to a servo-ram shown generally at 101 in FIG. 3. On the other hand, fluid from the control valve 41 flows through the conduits 45 and 44 and through a shut-off valve shown generally at 90, but is blocked by the shut-off-engage valve 61 when it is in the position illustrated in FIG. 1. It can therefore be seen that under normal operating conditions, that is, when no failure has been detected the portion of the system supplied by pressure $P_1$ is the active portion of the system while that portion supplied by the pressure $P_2$ is the stand-by system in so far as control is concerned. It should, however, be noted that fluid from source $P_1$ is supplied through conduit 51 and fluid from source $P_2$ through conduit 52 directly to the main control valve shown in FIG. 3 without passing through either of the shut-off valves or the engage valve.

The shut-off valve 61 includes a spool valve 62 which is loaded by way of spring 63 toward the right as viewed in FIG. 1. System pressure $P_1$, under normal operating conditions, is supplied through a restriction orifice 64 to chamber 65 which, when acting against the end area 66 of the spool 62, creates a force which overcomes the force of the spring 63 and causes the spool 62 to move toward the left to the position illustrated in FIG. 1. It should also be noted that the chamber 65 is connected by conduit 67 to the conduit 68 which is connected to the comparator 30. Thus, under normal operating conditions system pressure is connected to the chamber 65. Also under these conditions it can be seen that the spool 62 isolates the conduits 24 and 25 from each other by way of the lands 69, 70 and 71 thereon while lands 72 and 73 block the flow of fluid through conduits 45 and 46 from the control valve 41. The reduced diameter portion between lands 72 and 73 interconnects conduits 45 and 56 between the shut-off-engage valve 61 and the servo-ram 101.

As above indicated, during the normal operation of the system in accordance with the present invention the control valve 22 causes fluid to flow through the conduits 24 and 25 and through the shut-off-engage valve 61 to a servo-ram 101. However, in the event there is a discrepancy between the position indicating pressure signals generated by the transducers 26 and 27 sufficient to overcome the force of the springs 33 and 34, the spool 31 translates. When the spool 31 translates, system return $R_1$ is connected from the conduit 40 through the comparator 30 to the conduit 67 thence to the chamber 65. Connection of system return $R_1$ to the chamber 65, in view of the restriction orifice 64, immediately reduces the force applied against the end area 66 of the spool 61. Thus, the force of the spring 63 dominates and the spool 62 is moved toward the right as viewed in FIG. 1. Movement of the spool 62 toward the right connects system return $R_1$ through conduit 68 permanently to the chamber 65 irrespective of operation of the comparator 30 thereafter. Translation of the spool toward the right blocks flow of fluid from the control valve 22 through the conduits 24 and 25 and interconnects these conduits together on the servo-ram 101 side of the valve 61. Simultaneously, the blocking of conduits 45 and 46 from the control valve 41 is now removed and flow therethrough to the servo-ram 101 is permitted. Thus, by detection of a discrepancy between the control valve 22 and the monitor valve 23 of the active system the command function of the control system has been transferred from the active system (FIG. 1) to the stand-by system (FIG. 2). The term "command function" as used throughout this specification and the appendant claims is defined as meaning the ability to effect movement of a control member in response to input signals.

On the other hand, if the comparator 50 detects a discrepancy between the pressure signals applied to the chambers 47 and 48 and translates, as above described with respect to the comparator 30, system return is applied from conduit 75 through the comparator 50 and to the conduit 75 and thence to the chamber 77 of the shut-off valve 90. Normally system pressure $P_2$ is applied through the conduit 78 and the restriction orifice 79 to the chamber 77, thus maintaining the spool 81 in the position indicated against the force of the spring 82. However, upon the application of system return $R_2$ to the chamber 77 the force of the spring 82 dominates and translates the spool 81 toward the left as viewed in FIG. 2. Such translation of the spool 81 blocks the flow of fluid through the conduits 45 and 46 beyond the shut-off valve 90 and also connects system return $R_2$ from the conduit 83 permanently to the chamber 77 irrespective of the movement of the comparator 50 thereafter. Thus, it can be seen that in the event the comparator 50 detects a discrepancy between the position indicating pressure signals developed by the transducers associated with the control valve 41 and the monitor 42 in the stand-by system, the stand-by system is precluded from assuming the command function of the control system.

In the event it becomes desirable to either recycle a redundant control system constructed in accordance with the present invention, or alternatively to assure that the shut-off and engage valve 61 and the shut-off valve 90 are in the proper position prior to initiating operation of the system, there are provided start-up solenoids 85 and 86. These solenoids are of typical construction well known to those skilled in the art, and function to apply system pressure to the conduits 87 and 88 respectively. Application of system pressure to the conduit 87 moves the piston 89 toward the left as viewed in FIG. 1, thus overcoming the force of the spring 63 and allowing system pressure to enter the chamber 65. The solenoid is timed to remain energized sufficiently long enough to permit system pressure to pass through the restriction orifice 64 and into the chamber 65. Upon de-energization of the start- up solenoid 85, pressure is removed from the conduit 87 and the piston 89 then is moved back to the position illustrated in FIG. 1. In the event of a recycle during normal flight operations, and further in the event that the discrepancy remains and the comparator 30 remains operating, the sequence of operations above referred to will again occur thereby removing the command function from the control valve 22. Similarly, energization of solenoid 86 applies system pressure to the conduit 91 thus causing the piston 92 to move toward the right overcoming the force of the spring 82. The solenoid 86 similarly is timed to provide sufficient time for system pressure to enter the chamber 77 through the restriction orifice 79.

Referring now more specifically to FIG. 3, the servoram 101 takes the form of a tandem ram 102 slidably disposed within a pair of chambers 103 and 104 in such a manner that differential pressure applied through conduits 24 and 25 to the chamber 103 and across the piston 105 of the ram 102, or alternatively through the conduits 45 and 56 to the chamber 104 across the piston 106 of the ram 102 causes the ram 102 to move toward the right or left proportionally to the hydraeric fluid applied to the chambers 103 or 104 in response to the original application of the signals to the control valve 22 or the control valve 41.

As the ram 102 reciprocates, a lever 107 is secured at pivot 108 and is caused to rotate by way of its slidable connection 109 to the piston 103. Such pivotal rotation is transmitted through the connection 111 to a rod 112 which, in the absence of a signal, is spring centered by way of the spring 113.

A walking-beam 114 is connected between the rod 112 and the main course control valve shown generally at 115. The connections between the walking-beam 114 and the rod 112 and the valve 115 are pivotal connections, and in turn the walking-beam 114 is also pivoted at the point 116 to a manual input mechanism shown generally at 117, as illustrated by the dashed line 118. Through these interconnections the main control valve 115 may be manipulated either manually or through the application of command signals to the control valves 22 or 41, whichever is in position of exercising the command function.

As is illustrated, the main control valve 115 includes a slide valve 121 which is movable within a bore 122 in such a manner as to apply system pressure $P_1$ through the conduit 51 or system return $R_1$ through the conduit 123, depending upon the position of the slide valve 121, to the conduits 124 and 125 thereby to position the main cylinder shown generally at 150. Simultaneously, system pressure $P_2$ is applied to the conduit 52 and system return $R_2$ through the conduit 126 to either the conduits 127 or 128 also to position the main cylinder shown generally at 150. The main cylinder 150 is of a type and construction well known in the prior art and its functioning is thoroughly understood by those skilled in the art. Therefore, no further description will be given with respect thereto.

It should be further noted that in utilization of a system in accordance with the present invention, in the event of loss of main system pressure either $P_1$ or $P_2$ the shut-off and engage valve of the active system or shut-off valve of the stand-by system, respectively, generates to transfer the command function as above described in the event of the generation of a failure signal by comparators 30 or 50.

It will be understood by those skilled in the art that any number of control channels may be utilized to obtain the desired redundancy in accordance with any particular application to which the system is to be put. In any such instance, the number of valves, transducers and comparators is as illustrated and commented upon above. Thus, if there are N control channels desired, there must be N control valves, N monitor valves, 2N position indicating transducer means, and N comparators. In each instance one comparator interconnects the control and monitor position indicating pressure signals from the transducer means and compares them for coincidence. Thereafter, the switching occurs depending upon the number of control channels to accomplish the desired mission intended for the system designed in accordance with the present invention.

What is claimed is:

1. A redundant control system having a plurality of control channels, each of said channels comprising:

a separate source of hydraeric fluid;

a separate control valve connected to said source;

a separate monitor valve connected to said source;

said monitor valve being a dynamically exact model of said control valve connected to the same source of fluid;

a separate position indicating pressure signal generating transducer means connected individually to each of said control and monitor valves;

separate comparator means connected individually to receive only the position indicating pressure signal from said control valve and said monitor valve connected to the same source of fluid said comparator means being the only detector to which said position indicating pressure signals are connected thereby to detect disparity therebetweeen and provide a failure indicating signal responsive thereto;

switching means coupled to receive said failure indicating signal and disable a failed control channel responsive thereto; and each of said control channels being hydraerically isolated from the other of said control channels.

* * * * *

UNITED STATES PATENT AND TRADEMARK OFFICE

CERTIFICATE OF CORRECTION

PATENT NO. : 4,054,154

DATED : October 18, 1977

INVENTOR(S) : Richard K. Mason

It is certified that error appears in the above-identified patent and that said Letters Patent are hereby corrected as shown below:

Column 2, line 10, delete "pheumatics" and substitute -- pneumatics --.
Column 2, line 47, insert a period after the word "valve".
Column 4, line 12, delete "56" and substitute -- 46 --.
Column 4, line 54, delete "75" and substitute -- 76 --.
Column 5, line 45, delete "56" and substitute -- 46 --.
Column 5, line 59, after "main" delete "course".

Signed and Sealed this

*Twenty-eighth* Day of *March 1978*

[SEAL]

*Attest:*

RUTH C. MASON
*Attesting Officer*

LUTRELLE F. PARKER
*Acting Commissioner of Patents and Trademarks*